US006260019B1

(12) United States Patent
Courts

(10) Patent No.: US 6,260,019 B1
(45) Date of Patent: Jul. 10, 2001

(54) WEB-BASED PREDICTION MARKETPLACE

(75) Inventor: Thomas Craig Courts, Gillette, NJ (US)

(73) Assignee: Predict It Corporation, New York, NY (US)

( * ) Notice: Subject to any disclaimer, the term of this patent is extended or adjusted under 35 U.S.C. 154(b) by 0 days.

(21) Appl. No.: 09/263,206

(22) Filed: Mar. 5, 1999

(51) Int. Cl.[7] .............................. G06F 15/00; G06F 15/44; A63F 9/22
(52) U.S. Cl. .................................... 705/1; 705/12; 463/40
(58) Field of Search ................... 705/1, 10, 12; 463/41; 263/139, 269

(56) References Cited

U.S. PATENT DOCUMENTS

| | | | | |
|---|---|---|---|---|
| 4,592,546 | * | 6/1986 | Fascenda et al. | 463/40 |
| 5,034,807 | * | 7/1991 | Von Kohorn | 348/13 |
| 5,721,951 | * | 2/1998 | DorEL | 710/10 |
| 5,782,470 | * | 7/1998 | Langan | 463/41 |
| 5,794,210 | | 8/1998 | Goldhaber et al. | |
| 5,855,008 | | 12/1998 | Goldhaber et al. | |
| 6,015,345 | * | 1/2000 | Kail | 463/16 |

OTHER PUBLICATIONS

Messina, J. Fund Gives Youngest Tech Firms Introduction to NY Billioaires: $20 Million Available in Lesin Venture. Crain's New York Business, p. 4, Sep. 1998.*
Unknown. Predict It, Inc. Acquires Virtual Stock Exchange In.c Business Wire. Corp. Announ, Jul. 1999.*
Unknown. Desperately Seeking the Superhighway: BBDO WorldWide. Advertising Age, p. 17, Aug. 1994.*
Unknown. MSNBCSports.com Presents Interactive Coverage of the Breeders' Cup. Business Wire, p. 1252, Nov. 1998.*
Unknown. Disney Offers Interactive Sports Content. Screen Digest, Jan. 1999.*
Unknown. CBS SportsLine Runs for the Roses. Business Wire, p. 0568, Apr. 1999.*
Unknown. FOXSports.com Unveils Six Exciting Fantasy Football Games for Armchair Quarterbacks. Business Wire, p. 1240, Aug. 1999.*
Unknown. Predict it, Inc. and Sportsline USA, INc. Enter into Three year Distribution Agreement. Business Wire, p. 1025, Nov. 1999.*
Raynovich, R.S. Predict it Makes Book on its Users. RedHerring [online] May 25, 1999, [retrieved from the Internet 2000–05–18] <URL: www.predictit.com/about_prit/press/052599rf.jhtml>.*

(List continued on next page.)

Primary Examiner—Emanuel Todd Voeltz
Assistant Examiner—M. David Sofolleous
(74) Attorney, Agent, or Firm—Pennie & Edmonds LLP

(57) ABSTRACT

A method and apparatus for facilitating electronic commerce between suppliers of predictions and consumers of predictions. Suppliers provide their predictions on the outcomes of future events in one or more categories, and each supplier's accuracy is tracked. Consumers interested in obtaining predictions for one of more of those categories are allowed to selectively choose which suppliers' predictions they wish to view. The suppliers are compensated based on the number of consumers who view their predictions. In one embodiment, the consumers pay for the predictions that they view while the suppliers are paid a portion of the revenue obtained from the consumers. In another embodiment the consumers are not charged and all revenue is derived from advertisers. The system in accordance with the present invention includes a controller which automatically credits each supplier's account, aggregates earnings for that supplier, and automatically sends an electronic pay order to the Federal Reserve's automated clearinghouse to thereby facilitate payment.

25 Claims, 30 Drawing Sheets

OTHER PUBLICATIONS

Instituional Investor Magazine. [online] 1997, [retrieved from the Internet on 2000–06–13] <URL:www.iimagazine.com/research/aart/sector_semiconductor.html>.*

Unknown. Day Traders On–Line Offers All First Time Visitors Two Week Free Trial of Stock Picking Services. Business Wire, Oct. 22, 1998, p. 0125.

Day Traders On–Line Information + Sign–Up. Day Traders On–Line, 2000 [retrieved on May 18, 2000]. Retrieved from the Internet: <URL:www.daytrader.com/info.htm>.

Unknown Worldweb Brings Institutional Investor on the Web. PR Newswire. Jul. 1998, (see Para. 3.).

Schmerken, I. TheStreet.Com sells itself to the Street. Wall Street & Technology. Sep. 1999, vol. 17, No. 9, pp. 60–62.

* cited by examiner

SPORTSCAPPERS™
SPORTS PICKS NETWORK

Welcome To SportsCappers!

Please Login

Email: [                    ]

Password: [                    ]

[Login]

Do you need to update your Capper Info Click here to make changes.

<u>Become A SportsCapper - Its Free!</u>
As a SportsCapper all you have to do is enter your picks. Then when you get hot and your picks get bought, you earn real money paid with a real earnings check! Its that easy! Show the world how good you are, get paid, and have fun! We cover the NFL, College Football, NBA, College Basketball, MLB, and NHL. <u>Get started now!</u>

<u>Get the Picks of the Hottest Cappers in the Country!</u>
Search our database to find the hottest-of-the-hottest cappers in any sport over any period of time! Then get their picks on upcoming games for only $3 each! Want to test it out? <u>Become A SportsCapper</u> and get $3 in Complimentary Credit every day!

Click here to <u>Become A SportsCapper</u>, to <u>See Whos Hot</u>, or to learn more about <u>How It Works</u>.

*Fig. 2*

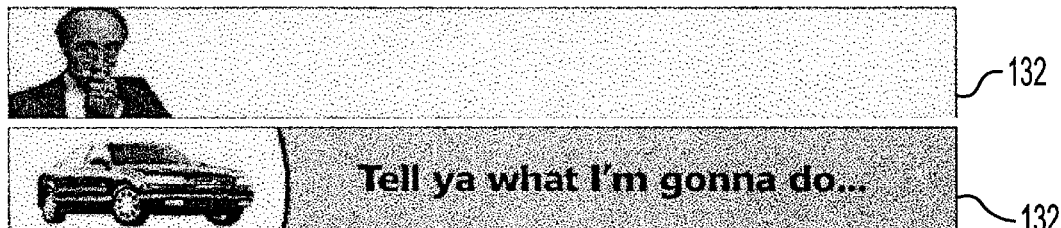

NO PURCHASE REQUIRED

160

1. How to Submit Your Picks: If you are at least 18 years old and a legal resident of the 50 United or the District of Columbia, you can become a SportsCapper. You must have Internet access, as well as an e-mail account that allows you to both send and receive mail. Submit your sports picks by accessing SPORTSCAPPERS, INC's registration form at URL: http://www.sportscappers.com and clicking on "Become A SportsCapper." After you have entered all of the requested information, including your active e-mail address, social security number, and a nickname and password of your choosing, you will be able to enter your own picks of teams that you think will win various sports contests. Picks are made against a line chosen by SPORTSCAPPERS, INC. in its sole discretion and identified on the web site. You can enter picks for any and all sports contests that you choose that are available for selection, simply by re-accessing SPORTSCAPPERS, INC.'s web site, clicking on "Enter Your Picks", and entering your e-mail address and password. Your picks for each game must be entered prior the beginning of that game. Game times are clearly posted next to each game (all times are Eastern Time). Once you submit a pick on a game, you cannot withdraw it, nor can you pick the opposite option. Failure to include all of the information required in the registration form may result in disqualification. Registering under more than one identity and/or using a false social security number will result in disqualification and may be penalized under law. In the event of a dispute regarding the identity of the person submitting picks, the picks will be deemed to have been submitted by the person whose name first appears in the registration form. SPORTSCAPPERS, INC. is not responsible for lost, late, incomplete, illegible, or misdirected e-mail; for failed, partial, or garbled computer transmissions; or for technical failures of any kind, including but not limited to electronic malfunctioning of any network, hardware, or software or by any human error which may occur in the processing of any players picks.

2. How to Purchase SportsCappers Picks: SportsCappers performances are measured using a units system, whereby SportsCappers receive the posted "To Win" number of units for a win, lose the posted "Risk" number of units for a loss, and neither for a tie. To see which SportsCapper had the highest number of units in earlier games, click on "See Whos Hot" for a listing of "hot" players. You can purchase SportsCappers picks for upcoming games for $3.00 each. Each time someone purchases a particular

*Fig. 4a*

SportsCappers pick, that SportsCapper will earn $1.00. From time to time complimentary credit may be given to users to purchase picks for promotional purposes. SportsCappers will not earn money on picks purchased with complimentary credit. Whether or not anyone buys your picks depends on several factors, some of which depend on your skill and the chance of what occurs in each game you pick. Ultimately, it depends on the historical record of your pick performance. SPORTSCAPPERS, INC. will receive payments through a secure online credit card processing system. SportsCappers who have earned money through the game will receive payment by check by US Mail on or about the fifteenth day of the third month following the month in which money was earned. For example, all money earned in January will be mailed around April 10th and should be received around April 15th. This waiting period is necessary in order to account for credit card charge-backs prior to paying SportsCappers. In order to receive payment, the SportsCapper must submit additional registration information, including name, mailing address, and telephone number, which can be submitted by returning to the Become A SportsCapper registration page. The SportsCapper must pay all applicable federal, state, and local taxes on any and all payments he or she receives from SPORTSCAPPERS, INC. Past performance by a particular SportsCapper is no guarantee of his/her future success in picking winning sports teams. SPORTSCAPPERS, INC. is not responsible for supplying picks for games that are played on a particular day but for which a particular SportsCapper has not entered picks.

3. Except where prohibited by law, a SportsCappers participation shall constitute his/her consent to SPORTSCAPPERS, INC.s use of the SportsCappers nickname, city, and state for promotional purposes without further payment or consideration. A SportsCappers participation shall also constitute his/her consent to the posting of his/her nickname and total earnings on SPORTSCAPPERS INC.s web site. By participating, each SportsCapper fully and unconditionally agrees to the terms of these Terms and Conditions and also agrees to release and hold harmless SPORTSCAPPERS, INC., its related companies, and their respective officers, directors, employees, and agents from and against any claim or cause of action arising out of participation or receipt or use of any payments received. Except where prohibited by law, each SportsCapper further agrees that: (1) any and all disputes, claims, and causes of action arising out of or connected with this Game or any earnings awarded, other than the administration of the Game and the determination of winners, shall be resolved individually, without resort to any form of class action, and exclusively by arbitration under the International Arbitration Rules (April, 1997) of the American Arbitration Association; (2) any and all claims, judgments, and awards shall be limited to actual out-of-pocket costs incurred, including costs associated with entering this Game but in no event attorneys fees; and (3) under no circumstances will a SportsCapper be permitted to obtain awards for, and each SportsCapper hereby waives all rights to claim punitive, incidental, and consequential damages, and any other damages, other than for actual out-of-pocket expenses, and any and all rights to have damages multiplied or otherwise increased. Except where prohibited by law, all issues and questions concerning the construction, validity, interpretation, and enforceability of these Terms and Conditions, or

*Fig. 4b* the rights and obligations of each SportsCapper an SPORTSCAPPERS, INC. in connection with the Game, shall be governed by, and construed in accordance with, the laws of the State of Colorado, without giving effect to any choice of law or conflict of law rules or provisions (whether of the State of Colorado or of any other jurisdiction), which would cause the application of the laws of any jurisdiction other than those of the State of Colorado. Subject to the foregoing, the Game may only be entered in or from on of the fifty (50) United States or the District of Columbia. Void where prohibited. Employees of SPORTSCAPPERS, INC., its affiliates and subsidiaries, and their immediate families (parents, children, siblings, and/or spouse) and members of their household are not eligible to play.

160

4. SPORTSCAPPERS, INC. is not responsible for any injury or damage to persons or property which may be caused, directly or indirectly, in whole or in part, from downloading any material from SPORTSCAPPERS, INC.'s Web site, regardless of whether the material was prepared by SPORTSCAPPERS, INC. or a third party, and regardless of whether the material is connected to SPORTSCAPPERS, INC.'s Web site by a hypertext link. SPORTSCAPPERS, INC. reserves the right to cancel or modify the program if fraud, technical failures, or any other factor beyond SPORTSCAPPERS, INC.'s reasonable control impairs the integrity of the program as determined by SPORISCAPPERS, INC. in its sole discretion.

5. If any SportsCapper makes any false statement in his or her participation in this game or otherwise misuses or manipulates any aspect of the game, such actions may constitute fraud, and SPORTSCAPPERS, INC. will seek to prosecute him or her to the fullest extent of the law. SPORTSCAPPERS, INC. expressly prohibits the use of profane nicknames, and may change or delete any nickname at its sole discretion.

6. Sponsored by SportsCappers, Inc., Suite 104, 218 East Valley Road, Carbondale, Colorado 81623. For legal entertainment purposes only. Copyright 1998 SportsCappers, Inc. All rights reserved.

For Entertainment Purposes Oniy

©1998. Content Copyright by SportsCappers, Inc. All Rights Reserved.

*Fig. 4c*

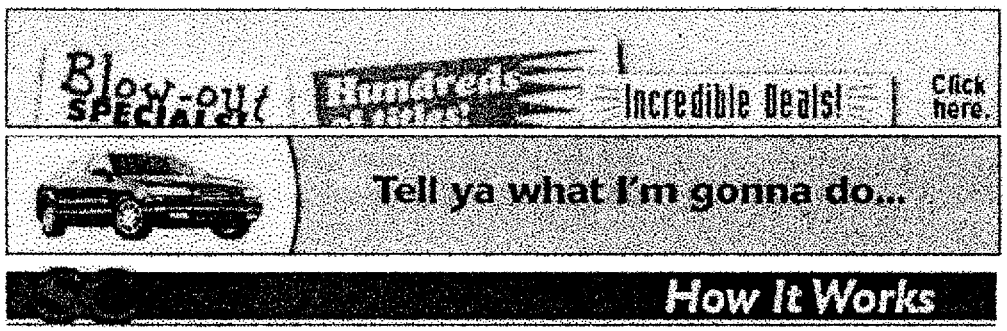

To Earn Money As A SportsCapper....

1. Become A SportsCapper! — 120
Registration is fast, free, and easy!
2. Enter Your Picks! — 172
There is never any charge to enter your picks, and you can enter as many or as few picks as you like in as many sports as you like. See our Line Policy for pick opening information.
3. See How You're Doing! — 174
After you log-in, your record appears on the top of all of your Whos Hot! reports, so you can always compare your performance to the Hottest of the Hottest. Records are updated daily after all games are over.
4. View Your Account! — 176
When you get hot and your picks get bought, you earn $1.00 for each pick purchased! And you have no expenses whatsoever! Just sit back and wait for your check!

170

A Few Tips For Success...

- Enter Your Picks Early!
  When you get hot, enter your picks as soon as the games are available to maximize your exposure and your earnings potential! See our Line Policy for pick opening information.
- Be Smart! — 174
  Use the same logic and restraint picking games as a SportsCapper as you would when betting real money in Vegas.
- Keep At It!
  Even if your season record is below par, keep at it! While some buyers concentrate on the seasons hottest SportsCappers, others want the picks of those who are on fire lately. Keep at it, and that could soon be you!

To Get The Picks Of The Hottest SportsCappers In The Country...

1. See Whos Hot! — 122'
Get a list of the Hottest SportsCappers in various sports categories over any number of previous days.
2. View Their Picks History!
Drill down to get a SportsCappers detailed Picks History to see how they achieved the record displayed on the Who's Hot! report.

*Fig. 5a*

3. View Their Current Picks

When the word "Picks" is highlighted in the View Current Picks column of the Whos Hot report, it means that SportsCapper has entered picks for upcoming games. Click on the word "Picks" to see which games he has entered picks on.

4. Decide Which Picks you Want!

Check the "Add to CapperCart" box next to the picks you want to buy. Remember, they are only $3.00 each! And for a limited time, all registered SportsCappers get $3.00 in complimentary credit everyday!

5. Check it Out!

When you have the picks you want, go to your CapperCart to checkout. We accept all major credit cards and use a Secure Server to ensure total security on all transactions. We do not store credit card numbers on our server; they are always deleted after your current transaction is processed. Save time and money by taking advantage of our great Pre-Purchased Credit offers!

Ready to get Started?

Click Here To Become A SportsCapper! — 120'
Or Click Here To See Whos Hot! — 122'

To read the legal stuff, please see our
Terms and Conditions. — 134
Please, take a look at our Privacy Policy.
— 176

*Fig. 5b*

See Who's Hot

Click Here For Help On How To Buy Picks — 202

Show Me The Top 25 SportsCappers

In the category: [College Basketball ▼] [(Side & O/U) ▼]

◉ for the previous [30] days    ◉ for the season

Optional: Add any SportsCapper to this search (Enter Nickname).
Note: As of 12/29/98, the Nickname search is case sensitive.

[          ]

[GO!]

| SportsCapper | Performance For This Search | | | | | Get Picks on: |
| | Units | Win % | Win | Loss | Tie | Detail | Future Games |
|---|---|---|---|---|---|---|---|
| SportsCappers: Log-In To View Your Record | | | | | | | |
| slickrick | 24.20 | 56.1% | 176 | 138 | 8 | Go | Future |
| RoarinSonoran | 21.40 | 54.3% | 292 | 246 | 15 | Go | Future |
| chopper | 17.60 | 61.8% | 55 | 34 | 3 | Go | None |
| tap2001 | 17.20 | 59.3% | 70 | 48 | 3 | Go | None |
| Scotty Mac | 17.20 | 57.5% | 92 | 68 | 5 | Go | None |
| Hustler | 16.70 | 56.5% | 108 | 83 | 7 | Go | None |
| joeycaesar | 16.00 | 56.5% | 104 | 80 | 4 | Go | None |
| dvd | 15.90 | 53.7% | 314 | 271 | 13 | Go | Future |
| Widowmaker | 14.10 | 54.9% | 145 | 119 | 4 | Go | Future |
| loops | 13.30 | 54.8% | 142 | 117 | 7 | Go | None |
| Mr.Bol | 12.90 | 54.7% | 146 | 121 | 9 | Go | Future |
| buzzy2 | 12.40 | 61.2% | 41 | 26 | 2 | Go | None |
| I'M SO GOOD | 11.90 | 55.5% | 101 | 81 | 3 | Go | Future |
| Chazz DiPirana | 11.60 | 61.3% | 38 | 24 | 2 | Go | None |
| biss | 11.40 | 53.3% | 304 | 266 | 14 | Go | None |
| Big Dog | 11.00 | 54.5% | 132 | 110 | 7 | Go | Future |
| too short | 10.90 | 55.6% | 89 | 71 | 3 | Go | None |
| DzzNutts | 10.10 | 59.2% | 42 | 29 | 1 | Go | None |
| Enforcer | 9.40 | 54.5% | 115 | 96 | 4 | Go | None |

*Fig. 7*

Picks History

| SportsCapper | Units | Win % | Win | Loss | Tie |
|---|---|---|---|---|---|
| slickrick | 24.20 | 56.1% | 176 | 138 | 8 |

| Date | Units | Win % | Win | Loss | Tie |
|---|---|---|---|---|---|
| 02/15/1999 | 0.00 | 0.0% | 0 | 0 | 0 |
| 02/14/1999 | -3.50 | 28.6% | 2 | 5 | 0 |
| 02/12/1999 | 1.70 | 62.5% | 5 | 3 | 3 |
| 02/11/1999 | 4.60 | 58.8% | 20 | 14 | 0 |
| 02/10/1999 | 1.30 | 56.3% | 9 | 7 | 0 |
| 02/09/1999 | 1.70 | 62.5% | 5 | 3 | 0 |
| 02/08/1999 | 2.80 | 71.4% | 5 | 2 | 0 |
| 02/07/1999 | 1.70 | 62.5% | 5 | 3 | 0 |
| 02/06/1999 | 1.40 | 57.1% | 8 | 6 | 1 |
| 02/05/1999 | -1.10 | 0.0% | 0 | 1 | 0 |
| 02/04/1999 | -0.20 | 52.0% | 13 | 12 | 0 |
| 02/03/1999 | 3.70 | 58.1% | 18 | 13 | 2 |
| 02/02/1999 | -2.60 | 40.0% | 4 | 6 | 0 |
| 02/01/1999 | 2.90 | 80.0% | 4 | 1 | 0 |
| 01/31/1999 | -4.70 | 30.0% | 3 | 7 | 0 |
| 01/30/1999 | 0.00 | 52.4% | 22 | 20 | 2 |
| 01/29/1999 | 4.00 | 100.0% | 4 | 0 | 0 |
| 01/28/1999 | 1.50 | 54.5% | 18 | 15 | 2 |
| 01/27/1999 | 12.10 | 71.0% | 22 | 9 | 1 |
| 01/26/1999 | 2.00 | 100.0% | 2 | 0 | 0 |
| 01/25/1999 | -4.60 | 25.0% | 2 | 6 | 0 |
| 01/19/1999 | -0.50 | 50.0% | 5 | 5 | 0 |

*Fig. 8*

Picks History — 242

| SportsCapper | Date | Units | Win % | Win | Loss | Tie |
|---|---|---|---|---|---|---|
| slickrick | 02/14/1999 | -3.50 | 28.6% | 2 | 5 | 0 |

240

248  250  252  254  244

Pepperdine at Santa Clara Sunday, February 14, 1999 06:00 pm ET
Final Score: 52-66

|  | Line | Risk | To Win | Score | Result |
|---|---|---|---|---|---|
| PEP | -2.0 | 1.10 | 1.00 | 52 | L |
| S CLR | 2.0 | 1.10 | 1.00 | 66 |  |
| Over | 0.0 | 0.00 | 0.00 | 118 |  |
| Under | 0.0 | 0.00 | 0.00 | 118 |  |

256  246

Cincinnati at St. Louis Sunday, February 14, 1999 05:30 pm ET
Final Score: 57-69

|  | Line | Risk | To Win | Score | Result |
|---|---|---|---|---|---|
| CIN | -6.0 | 1.10 | 1.00 | 57 | L |
| STL | 6.0 | 1.10 | 1.00 | 69 |  |
| Over | 0.0 | 0.00 | 0.00 | 126 |  |
| Under | 0.0 | 0.00 | 0.00 | 126 |  |

St. Bonaventure at Duquesne Sunday, February 14, 1999 04:30 pm ET
Final Score: 69-62

|  | Line | Risk | To Win | Score | Result |
|---|---|---|---|---|---|
| ST BN | -6.0 | 1.10 | 1.00 | 57 |  |
| DUQSN | 6.0 | 1.10 | 1.00 | 69 | L |
| Over | 0.0 | 0.00 | 0.00 | 131 |  |
| Under | 0.0 | 0.00 | 0.00 | 131 |  |

Florida State at Clemson Sunday, February 14, 1999 04:00 pm ET
Final Score: 45-78

|  | Line | Risk | To Win | Score | Result |
|---|---|---|---|---|---|
| FL ST | 6.5 | 1.10 | 1.00 | 45 | L |
| CLEM | -6.5 | 1.10 | 1.00 | 78 |  |
| Over | 0.0 | 0.00 | 0.00 | 123 |  |
| Under | 0.0 | 0.00 | 0.00 | 123 |  |

*Fig. 9a*

| North Carolina State at Virginia Sunday, February 14, 1999 04:00 pm ET Final Score: 79-82 | | | | | |
|---|---|---|---|---|---|
| | Line | Risk | To Win | Score | Result |
| NC ST | -1.0 | 1.10 | 1.00 | 79 | L |
| VIR | 1.0 | 1.10 | 1.00 | 82 | |
| Over | 0.0 | 0.00 | 0.00 | 161 | |
| Under | 0.0 | 0.00 | 0.00 | 161 | |

| George Washington at Dayton Sunday, February 14, 1999 03:00 pm ET Final Score: 69-65 | | | | | |
|---|---|---|---|---|---|
| | Line | Risk | To Win | Score | Result |
| G WSH | -1.0 | 1.10 | 1.00 | 69 | W |
| DYTN | 1.0 | 1.10 | 1.00 | 65 | |
| Over | 0.0 | 0.00 | 0.00 | 134 | |
| Under | 0.0 | 0.00 | 0.00 | 134 | |

| Syracuse at Pittsburgh Sunday, February 14, 1999 02:00 pm ET Final Score: 75-67 | | | | | |
|---|---|---|---|---|---|
| | Line | Risk | To Win | Score | Result |
| SYR | -6.5 | 1.10 | 1.00 | 75 | W |
| PITT | 6.5 | 1.10 | 1.00 | 67 | |
| Over | 0.0 | 0.00 | 0.00 | 142 | |
| Under | 0.0 | 0.00 | 0.00 | 142 | |

*Fig. 9b*

Current Picks slickrick has made picks on the following games.

You Are Not Logged In — 266

You must Log In or Register
In Order to Purchase Picks. — 270
268

260

| Oklahoma at Missouri 2/15/1999 9:30 PM ET | | | | |
|---|---|---|---|---|
| Team | Line | Risk | To Win | |
| OKA | 6.0 | 1.10 | 1.00 | |
| MSRI | -6.0 | 1.10 | 1.00 | ☐ Add Sides Pick to Cart |
| Over | 0.0 | 0.00 | 0.00 | |
| Under | 0.0 | 0.00 | 0.00 | 264 |

262

| Akron at Northern Illinois 2/15/1999 8:05 PM ET | | | | |
|---|---|---|---|---|
| Team | Line | Risk | To Win | |
| AKR | -7.5 | 1.10 | 1.00 | |
| N ILL | 7.5 | 1.10 | 1.00 | ☐ Add Sides Pick to Cart |
| Over | 0.0 | 0.00 | 0.00 | |
| Under | 0.0 | 0.00 | 0.00 | 264 |

262

| Illinois-Chicago at Wisconson Green Bay 2/15/1999 8:05 PM ET | | | | |
|---|---|---|---|---|
| Team | Line | Risk | To Win | |
| ILL-C | 11.5 | 1.10 | 1.00 | |
| WI GB | -11.5 | 1.10 | 1.00 | ☐ Add Sides Pick to Cart |
| Over | 0.0 | 0.00 | 0.00 | |
| Under | 0.0 | 0.00 | 0.00 | 264 |

262

| Providence at St. Johns 2/15/1999 7:30 PM ET | | | | |
|---|---|---|---|---|
| Team | Line | Risk | To Win | |
| PROV | 12.0 | 1.10 | 1.00 | |
| ST JN | -12.0 | 1.10 | 1.00 | ☐ Add Sides Pick to Cart |
| Over | 0.0 | 0.00 | 0.00 | |
| Under | 0.0 | 0.00 | 0.00 | 264 |

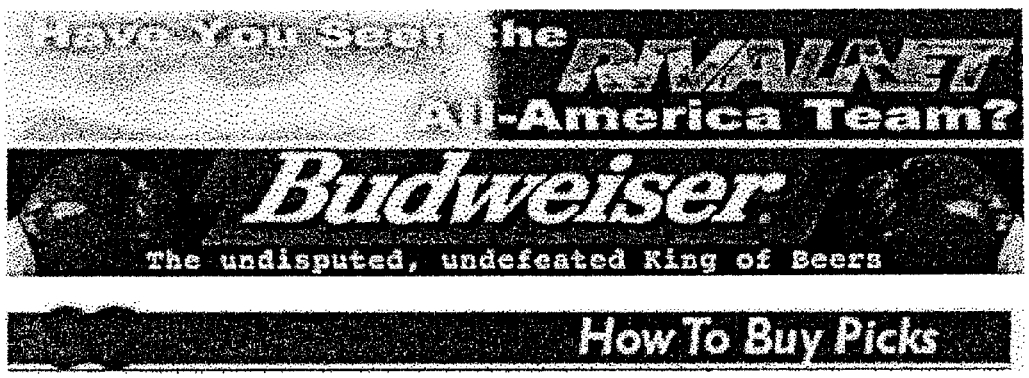

280

1. See Whos Hot
Get a list of the Hottest SportsCappers in various sports categories over any number of previous days.  } 282

2. View Their Picks History
Scroll down to get a SportsCappers detailed Picks History to see how they achieved the record displayed on the Whos Hot report.  } 284

3. View Their Current Picks
When the word "Picks" is highlighted in the View Current Picks column of the Whos Hot report, it means that SportsCapper has entered picks for upcoming games. Click on the word "Picks" to see which games he has entered picks on.  } 286

4. Decide Which Picks You Want
Put a check in the "Add to CapperCart" box next to the picks you want to buy. Remember, they are only $3.00 each! And for a limited time, all registered SportsCappers get $3.00 in Complimentary Credit every day!  } 288

5. Check Out
When you have the picks you want, go to your CapperCart to check out. We accept all major credit cards and use a Secure Server to ensure total security on all transactions. We do not store credit card numbers on our server; they are always deleted after your current transaction is processed. Save time and money by taking advantage of our great Pre-Purchased Credit offers!  } 290

*Fig. 11*

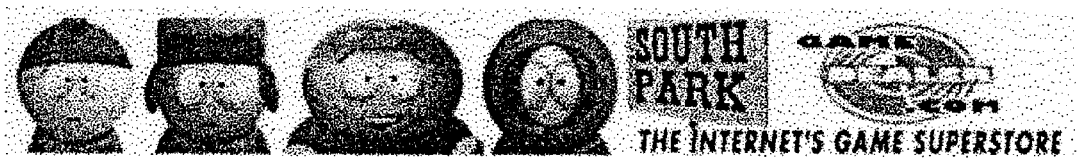

SportsCappers, Inc. takes your right to privacy very seriously. We will not obtain personally identifying information about you when you visit our Web site unless you choose to register with us. We will not sell or distribute your private information, including your name, mailing address, email address, and telephone number, or any data concerning your activity on our site, to anyone outside of our company.

300

If you choose to participate in the Game, we may use your nickname and game performance information (such as your picks record, total earnings, etc.) for promotional purposes. In no case will we use your real name.

302

Please note that no communications medium is absolutely impenetrable by criminals. We will fully pursue and support prosecution of anyone criminally acquiring or attempting to acquire information about our users.

If you have any questions regarding this Privacy Policy, or if you would like to review the information that we have acquired about you, please send your request to us via email at info@sportscappers.com.

*Fig. 12*

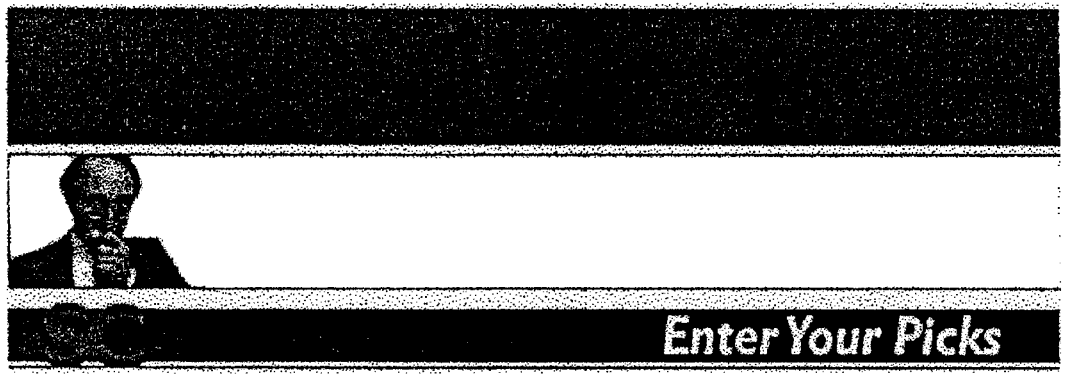
Please choose a sport from those listed in the pull-down menu below!
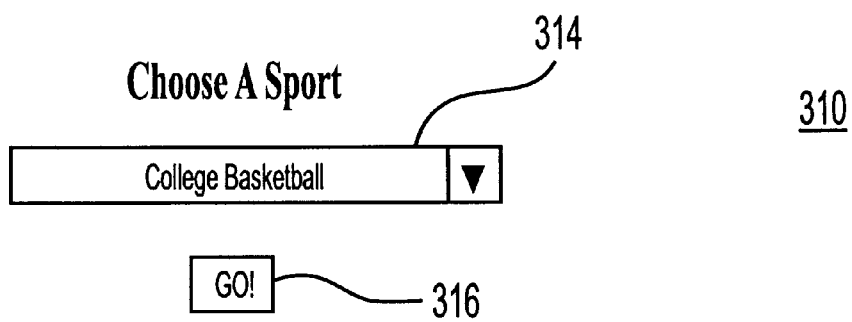
310
For game opening information, please see our Line Policy.
312
*Fig. 13*

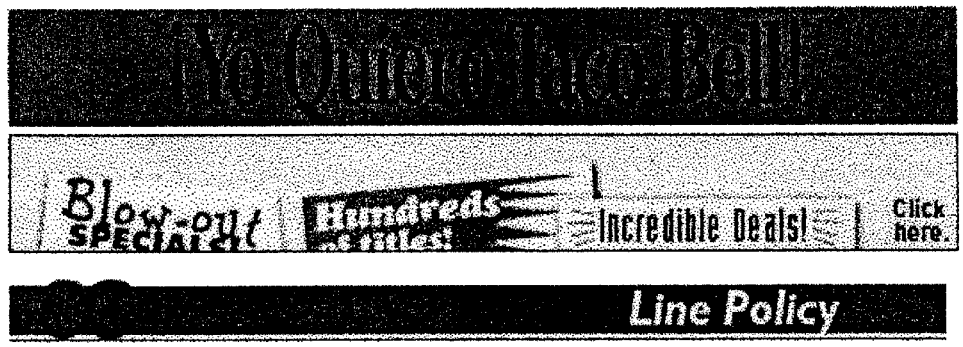

320

Line Source
Given its widespread acceptance, we have chosen the Stardust Line as our primary line source. } 322

Pick Entry Opening Times

- Basketball, Baseball and Hockey will generally open before 12:00pm ET on the day of the games.
- Football will generally open before 12:00pm ET two days prior to the game.

} 324

Spreads and Odds
For football and basketball we use point spreads and the standard "risk 1.1 units to win 1.0 units" on all pick options. For baseball, we use odds with a .10 unit differential on the side option (this moves to a .20 unit differential on 2:1 favorites or better), and a .20 unit differential on the over/under option. For hockey, we use a combination line, also known as a split line. There is a goal spread and odds on each pick option. Hockey odds have a .20 unit differential for both the side option and over/under option. } 326

Presentation
Pick options for all sports are presented in one easy to understand format. For each game we list, in order, the Visiting Team, the Home Team, the Over, and the Under. Next to each of these pick options we list the point spread, the number of units you risk, and the number of units you stand to win. } 328

Questions?
If you have any questions or comments on our Line Policy, please Contact Us via e-mail. } 330

Click Here To Become A SportsCapper!
Or Click Here To See Who's Hot!

*Fig. 14*

Enter Your Picks

You Are Not Logged In — 342

You must Log In or Register In Order to Purchase Picks.

Princeton at Columbia
Friday, January 29, 1999 7:30 PM ET

| Team  | Line  | Risk | To Win | Pick | No Pick |
|-------|-------|------|--------|------|---------|
| PRINC | -14.5 | 1.10 | 1.00   | ○    | ◉       |
| COLM  | 14.5  | 1.10 | 1.00   | ○    |         |
| Over  | 0.0   | 0.00 | 0.00   | ○    | ◉       |
| Under | 0.0   | 0.00 | 0.00   | ○    |         |

Pennsylvania at Cornell
Friday, January 29, 1999 7:30 PM ET

| Team  | Line  | Risk | To Win | Pick | No Pick |
|-------|-------|------|--------|------|---------|
| PENN  | -11.0 | 1.10 | 1.00   | ○    | ◉       |
| CORN  | 11.0  | 1.10 | 1.00   | ○    |         |
| Over  | 0.0   | 0.00 | 0.00   | ○    | ◉       |
| Under | 0.0   | 0.00 | 0.00   | ○    |         |

San Diego Univ at Pepperdine
Friday, January 29, 1999 10:00 PM ET

| Team  | Line | Risk | To Win | Pick | No Pick |
|-------|------|------|--------|------|---------|
| USD   | 9.0  | 1.10 | 1.00   | ○    | ◉       |
| PEP   | -9.0 | 1.10 | 1.00   | ○    |         |
| Over  | 0.0  | 0.00 | 0.00   | ○    | ◉       |
| Under | 0.0  | 0.00 | 0.00   | ○    |         |

St. Marys at Loyola Marymount
Friday, January 29, 1999 10:05 PM ET

| Team  | Line | Risk | To Win | Pick | No Pick |
|-------|------|------|--------|------|---------|
| ST MY | 3.0  | 1.10 | 1.00   | ○    | ◉       |
| LY-MM | -3.0 | 1.10 | 1.00   | ○    |         |
| Over  | 0.0  | 0.00 | 0.00   | ○    | ◉       |
| Under | 0.0  | 0.00 | 0.00   | ○    |         |

*Fig. 15*

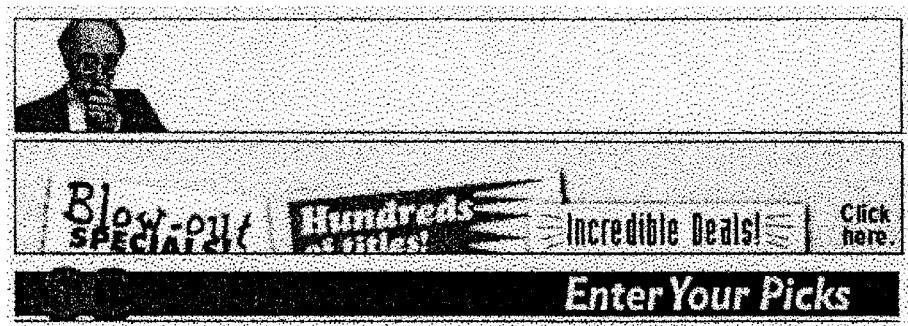

For game opening information please see our line policy. —372

| Princeton at Columbia Friday, January 29, 1999 7:30 PM ET | | | | | |
|---|---|---|---|---|---|
| Team | Line | Risk | To Win | Pick | No Pick |
| PRINC | -14.5 | 1.10 | 1.00 | ○ | ○ |
| COLM | 14.5 | 1.10 | 1.00 | ● | |
| Over | 0.0 | 0.00 | 0.00 | ○ | ● |
| Under | 0.0 | 0.00 | 0.00 | ○ | |

378
376
374
380

| Pennsylvania at Cornell Friday, January 29, 1999 7:30 PM ET | | | | | |
|---|---|---|---|---|---|
| Team | Line | Risk | To Win | Pick | No Pick |
| PENN | -11.0 | 1.10 | 1.00 | ○ | ○ |
| CORN | 11.0 | 1.10 | 1.00 | ● | |
| Over | 0.0 | 0.00 | 0.00 | ○ | ● |
| Under | 0.0 | 0.00 | 0.00 | ○ | |

370

| San Diego Univ at Pepperdine Friday, January 29, 1999 10:00 PM ET | | | | | |
|---|---|---|---|---|---|
| Team | Line | Risk | To Win | Pick | No Pick |
| USD | 9.0 | 1.10 | 1.00 | ● | ○ |
| PEP | -9.0 | 1.10 | 1.00 | ○ | |
| Over | 0.0 | 0.00 | 0.00 | ○ | ● |
| Under | 0.0 | 0.00 | 0.00 | ○ | |

| St. Marys at Loyola Marymount Friday, January 29, 1999 10:05 PM ET | | | | | |
|---|---|---|---|---|---|
| Team | Line | Risk | To Win | Pick | No Pick |
| ST MY | 3.0 | 1.10 | 1.00 | ● | ○ |
| LY-MM | -3.0 | 1.10 | 1.00 | ○ | |
| Over | 0.0 | 0.00 | 0.00 | ○ | ● |
| Under | 0.0 | 0.00 | 0.00 | ○ | |

SUBMIT PICKS —382

*Fig. 16*

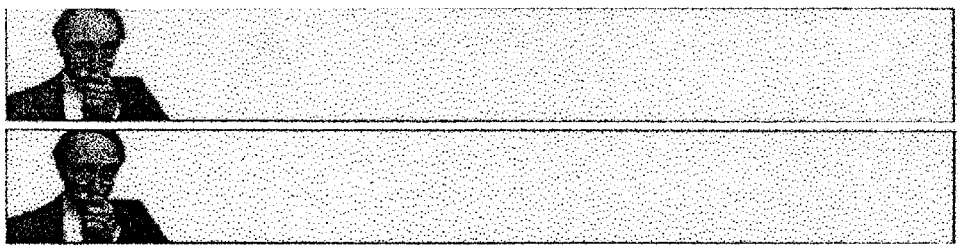

Please review your picks, then press the Confirm Picks button to register them. — 372

394 — | CONFIRM PICKS | MAKE CHANGES | — 396     390

| Princeton at Columbia |||||
| Friday, January 29, 1999 07:30 pm ET |||||
|---|---|---|---|---|
| Team | Line | Risk | To Win | Pick |
| PRINC | -14.5 | 1.10 | 1.00 | |
| COLM | 14.5 | 1.10 | 1.00 | X |
| Over | 0.0 | 0.00 | 0.00 | |
| Under | 0.0 | 0.00 | 0.00 | |

398

| Pennsylvania at Cornell |||||
| Friday, January 29, 1999 07:30 pm ET |||||
|---|---|---|---|---|
| Team | Line | Risk | To Win | Pick |
| PENN | -11.0 | 1.10 | 1.00 | |
| CORN | 11.0 | 1.10 | 1.00 | X |
| Over | 0.0 | 0.00 | 0.00 | |
| Under | 0.0 | 0.00 | 0.00 | |

| San Diego Univ. at Pepperdine |||||
| Friday, January 29, 1999 10:00 pm ET |||||
|---|---|---|---|---|
| Team | Line | Risk | To Win | Pick |
| USD | 9.0 | 1.10 | 1.00 | X |
| PEP | -9.0 | 1.10 | 1.00 | |
| Over | 0.0 | 0.00 | 0.00 | |
| Under | 0.0 | 0.00 | 0.00 | |

*Fig. 17a*

| St. Marys at Loyola Marymount Friday, January 29, 1999 10:05 PM ET | | | | |
|---|---|---|---|---|
| Team | Line | Risk | To Win | Pick |
| ST MY | 3.0 | 1.10 | 1.00 | X |
| LY-MM | -3.0 | 1.10 | 1.00 | |
| Over | 0.0 | 0.00 | 0.00 | |
| Under | 0.0 | 0.00 | 0.00 | |

| CONFIRM PICKS | | MAKE CHANGES |
|---|---|---|

For game opening information, please see our Line Policy.

*Fig. 17b*

Hello, bambi, here is your current account balance.

402 { Pre-Purchased Credit Balance $ 0.00   Comp. Credit Balance $ 3.00 } 404   Total Earnings $ 0.00 } 406

Update Your Registration Info. ～ 408

Buy Pre-Purchased Credit And Save Up To 33%!     410

| CapperCart for bambi |
|---|
| Available Credit |
| Pre-Purchased Credit Balance: $ 0.00<br>Comp. Credit Balance: $ 3.00<br>Pre-Purchased Credit, This Order: $0.00<br><br>Total Available Credit: $ 3.00 |
| This Sale |
| To remove an item, check the box and click the "Remove" button below.<br>Picks in CapperCart:<br><br>Picks total, this order: $ 0.00<br><br>Pre-Purchased Credit in CapperCart:<br><br>Pre-Purchased Credit total, This Order: $0.00<br><br>    [ Remove Seleted Items(s) from CapperCart ]<br><br>Total, This Order: $0.00 |
| Available Credit |
| Pre-Purchased Credit Applied: $ 0.00<br>Comp. Credit Applied: $ 0.00<br>Total Credit Applied: $ 0.00 |
| Remaining Credit After This Sale |
| Pre-Purchased Credit Remaining: $ 0.00<br>Comp. Credit Remaining: $ 0.00<br>Total Credit Remaining: $ 3.00<br>Total Amount Due: $ 0.00 |

412 — Available Credit section
414 — This Sale section
416 — Remove button
418 — Available Credit (Applied)
420 — Remaining Credit After This Sale

[ Use Credit ] — 422

*Fig. 19*

Predict It! Sports — With the Spread

REGISTER | ENTER PICKS | TOP ANALYSTS | VIEW EARNINGS | HOME

How it Works

With the advent of the internet, information once available only to the so-called "expert analysts" is now available to anyone. Predict it! has leveled the playing field, allowing everyone to show their prowess at predicting the outcome of future events. Here's how our first application, "Predict it Sports With A Spread", works.

After registering to become a Predict It! Analyst, just enter your picks into the system. Everyone's record is tracked, and people looking for winning picks can find the Top Analysts in any sports category over any period of time, and get their picks on past, current and future games. When you do well and your picks are viewed by others, you get paid-real money with a real earnings check! It's free to participate as an analyst, and it's free to get the picks of the Top Analysts. Click here to Learn more, or click here to get started now - registration is fast and easy!

Log in

Email: [        ]
Password: [        ]
[Login]

Enter Your Picks

[ ▼ ]
[GO!]

View Top Analysts

Analysts:
[The Top 25 Analysts ▼]
[Group]

Sport:
[College Basketball ▼]

Sub-Categories:
[(Side & O/U) ▼]

TimeFrame:
◉ The Past [  ] days
○ The Season
○ [        ] Through
[        ]

Minimum # of Picks: [  ]

Optional: Add an Analyst's results to this search. Enter Nickname
[        ]
[GO!]

Copyright 1999 Predict it! Corp.    Email us at info@predictit.com

*Fig. 20*

Contact Information
(Not required to register, But required to receive your earnings payment)

First Name: — 514

Last Name: — 514

Street Address: — 514

City: — 514

State/Province: — 514

State/Province: — 514

State/Province: — 514

State/Province: — 514

I have read and agree to the Terms and Conditions of Participation.

[ Register ] — 516

Copyright 1999 Predict it! Corp.  Email us at info@predictit.com

Predict It! Sports  With the Spread

REGISTER | ENTER PICKS | TOP ANALYSTS | VIEW EARNINGS | HOME

How it Works

With the advent of the internet, information once available only to the so-called "expert analysts" is now available to anyone. Predict it! has leveled the playing field, allowing everyone to show their prowess at predicting the outcome of future events. Here's how our first application, "Predict it Sports With A Spread", works.

After registering to become a Predict It! Analyst, just enter your picks into the system. Everyone's record is tracked, and people looking for winning picks can find the Top Analysts in any sports category over any period of time, and get their picks on past, current and future games. When you do well and your picks are viewed by others, you get paid-real money with a real earnings check! It's free to participate as an analyst, and it's free to get the picks of the Top Analysts. Click here to Learn more, or click here to get started now - registration is fast and easy!

Log out

Welcome, dmx. for security reasons, please remember to log out when you are done. After a period of non-use, the system will log you out automatically. If you are forced off you may log on again.

[Login]

Update Your Registration info

Enter Your Picks

[College Basketball ▼]
[GO!]

View Top Analysts

Analysts:
[The Top 25 Analysts ▼]
[Group]

Sport:
[College Basketball ▼]

Sub-Categories:
[(Side & O/U) ▼]

TimeFrame:
⦿ The Past [   ] days
○ The Season
○ [           ] Through
  [           ]

Minimum # of Picks: [   ]

Optional: Add an Analyst's results to this search. Enter Nickname
[           ]
[GO!]

Copyright 1999 Predict it! Corp.    Email us at info@predictit.com

*Fig. 22*

Fig. 23

570
| Analyst |
|---|
572 — [ ] Go!
Enter Full/Partial Nickname and Press Go! to see a list of matching nicknames
| Groups |
|---|
574 — Add a Group
576
| Group Member Management - Add |
|---|
[ Save ] [ Cancel ]
Group Name [                    ] — 578
580
| Groups |
|---|
A List of Group Members is presented below. To add an analyst to the group, click on a name at the left. To Delete a NickName from the group, click on the delete button next to the Analyst's name.
*Fig. 24*

WEB-BASED PREDICTION MARKETPLACE

RELATED APPLICATIONS

There are no related applications.

1. Field of the Invention

The present invention is directed to an electronic network-based marketplace for supplying and consuming predictions of future events. More particularly, it is directed to a marketplace in which suppliers are compensated based on the number of consumers who view their predictions.

2. Background of the Invention

The internet, also called the world wide web, or simply, the "web", has been increasingly used as a means of communication in recent years. One area in which the web has found particular use is electronic commerce whereby goods and services provided by a supplier are made available for sale to a consumer. As seen in FIG. 1, the web 100 serves as the communication means between consumers 102 and suppliers 104, each of which is represented as a computer connected to the web. A consumer and a supplier can communicate directly with one another across the web if one knows the other's e-mail address, or web-site URL, and this type of information can often be found by using well-known internet search engines available to either via their internet service provider.

As an alternative to direct communication between a consumer 102 and a supplier 104, one may instead use a facilitator 106, represented by a computer in FIG. 1. The facilitator's web-site serves as a depository of information concerning the goods and/or services offered by a number of suppliers. Consumers can visit the facilitator's website and browse through one or more categories of good and/or services to view the offerings of various suppliers. After viewing these, a consumers may then request more information about a particular item or service, or may even purchase the goods and/or services. This can be done by either directly contacting the supplier, if the facilitator so permits, or by contacting the supplier via the facilitator, with the facilitator acting as an intermediary. The facilitator may charge either the customer, the supplier, or both, for introducing one to the other, either on a subscription basis, a per-introduction basis, a per-completed transaction, a sales-volume basis, or in accordance with some other agreed-upon arrangement with the supplier and/or buyer. Thus, items as collectibles, airline tickets and a host of other goods and services can be obtained, either at a fixed price, or by auctions and even reverse-auctions, all via a facilitator.

SUMMARY OF THE INVENTION

The present invention is directed to a marketplace for information provided by a plurality of suppliers for display on a facilitator's web-site. The information resides in a relational database on the facilitator's web-site and can be selectively viewed by a consumer without having to jump to a supplier's web-site. A supplier is compensated based on the number of times that that supplier's information is viewed by consumers. In the preferred embodiment, the type of information supplied by the suppliers are predictions about future events, and consumers view these predictions.

In one embodiment, a consumer is charged by the facilitator for viewing a supplier's information, and a portion of the payment collected from that consumer is then passed on to the supplier as compensation. For this, the consumer must first provide the facilitator with billing information to establish some form of electronic collection scheme so as to permit the facilitator to charge the consumer for each access to information.

In another embodiment, consumers are charged nothing for viewing a supplier's information. Revenue to pay the suppliers comes from advertisers, whose advertisements are displayed while a user is logged into the system. Because the consumers are charged nothing in this embodiment, the invention also contemplates preventing a supplier from benefitting from friends (or themselves) repeatedly viewing the same information provided by a supplier simply for the purpose of boosting the amount of compensation made to that supplier. This is done by crediting a supplier only if a particular consumer has not previously viewed that particular piece of information. For this, the facilitator keeps track of what all items a particular consumer has previously viewed for which the seller has already been credited.

BRIEF DESCRIPTION OF THE DRAWINGS

FIGS. 2–19 present a first embodiment of the present invention (called "SPORTSCAPPERS™") wherein:

FIG. 2 show the home page;

FIG. 3 show the registration page;

FIGS. 4a–4c show the terms-and-conditions page;

FIGS. 5a–5b show the instruction page;

FIG. 6 shows the top-analysts-criteria page;

FIG. 7 shows the top-analysts-display page;

FIG. 8 shows the supplier-daily-history page;

FIGS. 9A & 9B show the supplier-daily-event page;

FIG. 10 shows the future-picks page;

FIG. 11 shows the how to-buy-picks instruction page;

FIG. 12 shows the privacy-policy page;

FIG. 13 shows the enter-your-picks-category page;

FIG. 14 shows the line-policy page;

FIG. 15 shows the enter-your-picks-not-logged-in page;

FIG. 16 shows the enter-your-picks-play page;

FIGS. 17a–17b show the confirmation-of-picks page;

FIG. 18 shows the member-account page;

FIG. 19 shows the shopping-cart-payment page;

FIGS. 20–24 present a second embodiment of the present invention (called "PREDICTIT!™") wherein:

FIG. 20 is the home page;

FIG. 22 is the welcome page;

FIG. 23 is the top-analysts-criteria page; and

FIG. 24 is the group-management page.

DETAILED DESCRIPTION OF THE INVENTION

Figure 1:
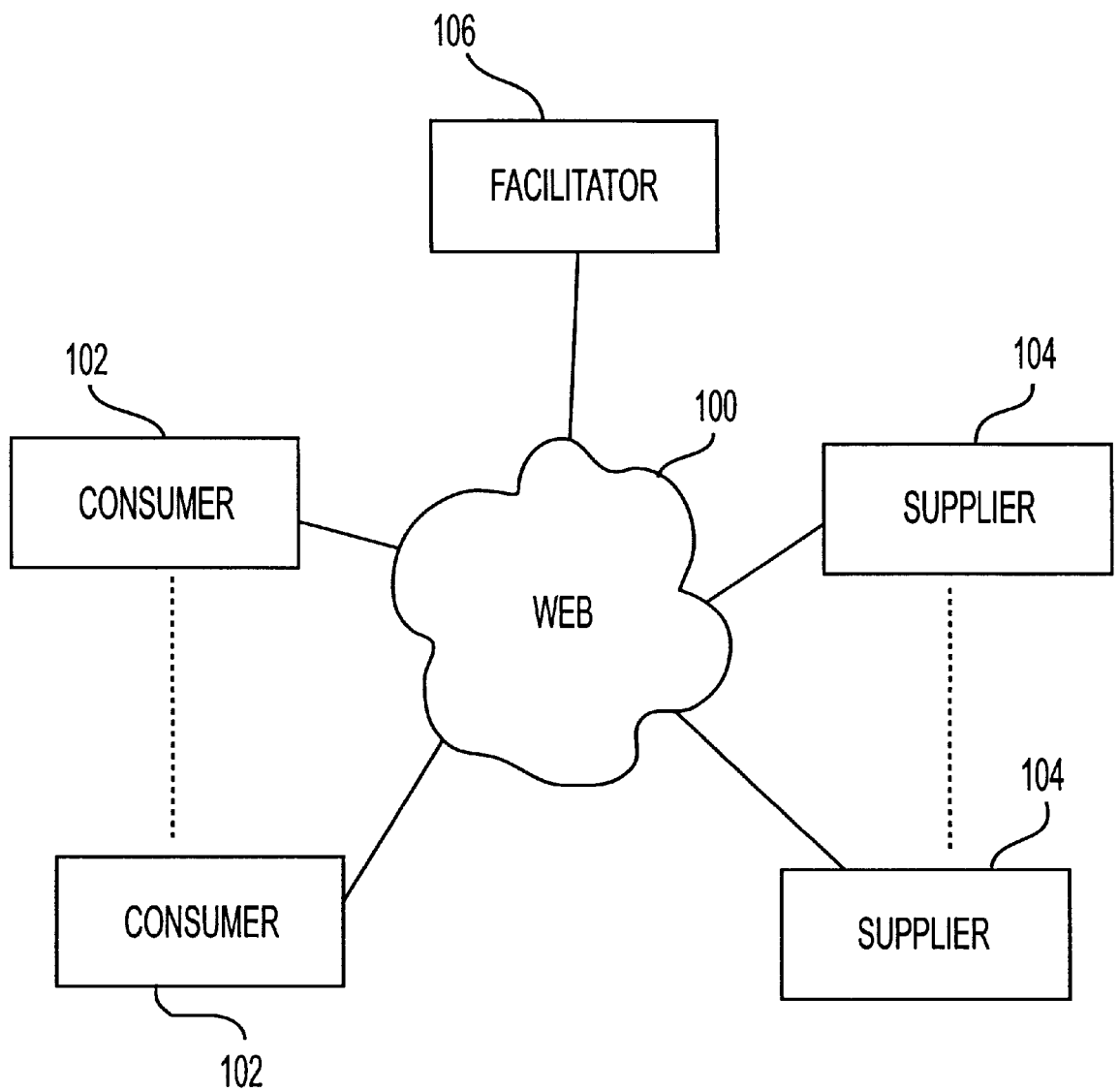
FIG. 1 is a schematic showing suppliers, consumers and facilitators connected by the web.

The prediction marketplace in the present invention is run by a facilitator who provides a web-site on one or more server computers. The server computer typical includes a processor, one or more memory storage devices such as semiconductor memory, disk drives or other computer storage medium, an interface device such as a modem or Ethernet adapter, or the like to connect the server computer to the internet or other network, along with other elements, as is known to those skilled in the art. The server computer is preferably connected to a database, such as a relational database management system. Resident in a memory device associated with the computer is executable software, typically including interface code, algorithmic code, database code, and other code which performs all the functions needed to operate the server computer.

The web-site comprises a number of pages written in hypertext mark-up language (HTML) suitable for transmission to a remote computer across the internet or other network. When visiting the web-site, consumers can access and view the predictions of suppliers, and suppliers can, among other things, enter predictions for future events. The supplier's predictions, results of those predictions, and other information at the web-site is preferably stored in the relational database, in a manner known to those skilled in the art.

FIGS. 2–19 show one embodiment of the user interface to a prediction marketplace in accordance with the present invention. The embodiment shown, called SPORTSCAPPERS™, provides a marketplace for predictions on the outcome of certain sporting events selected by the facilitator. A user accesses the web-site through the internet and is permitted to navigate through the web-site to enter predictions, view predictions, or simply browse through various portions of the web-site.

FIG. 2 shows the front page 110 of this web-site. The user is provided with a window for logging in. A user may log in only if that user has previously registered and has established an identity within the marketplace (i.e., is a member). If the user is a member, the user is asked to enter his email address in login e-mail address field 114 and his password in login password field 116, and then click on the 'Login' icon 118.

If the user is not already a member, or does not want to login even though he is a member, the front page includes a number of hot links to permit further navigation through the web-site. Each hot link is represented by underlined text or an icon which can be activated, as is commonly known to those skilled in the art. A registration link 120 "Become a SportsCapper—It's Free" sends a user to a registration page 130 which asks for information allowing a user to become a member. A best-predictors link 122 "Get the picks of the Hottest Cappers in the Country" or "See Who's Hot" sends a user to a top-analysts-criteria page 200 which leads to information on the performance of the best prediction suppliers. Finally, an instruction-and-information link 124 "How it works" sends the user to an information page 170 which further explains how to play the game. Auxiliary links 120", 122", which are associated with additional text, send the user to the same pages as links 120, 122, respectively, thereby providing the user with more than one link to the same page.

Figure 3:
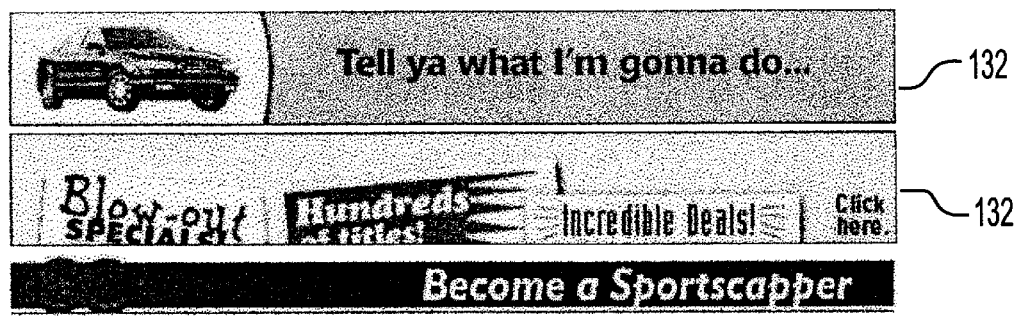

FIG. 3 shows the registration page 130, which allows a user to become a member. Registration page 130 preferably includes one or more windows 132 in which advertisements placed by third parties, or even the facilitator, are displayed. The advertisements may promote specific products, specific services, a specific entity such as a business or organization, and will often provide one or more links to other sites where more information may be obtained. The Registration page 130 also includes a terms-of-registration link 134 "Terms and Conditions" which sends a user to a terms and conditions page 160a–c detailing rules of the marketplace, the respective obligations of the facilitator and the users, and the terms to which the user agrees, among other items. The remainder of the registration page 130, however, is devoted to registration information In this embodiment, certain identifying information 136 is required of all users who wish to be members, i.e., participants in the marketplace. The registration nickname field 138 requests a unique nickname by which the user will be known in the system, especially when that user supplies predictions. No two users in the marketplace can have the same nickname so as to prevent confusion. The registration e-mail address field 140 asks for the user's email address and the registration password field 142 asks for a user-selected password. The registration password verification field 144 asks the user to repeat the password to ensure that the user did not mistype it the first time. Finally, the registration password hint field 146 requests the user to enter a word which will remind the user of his password, should the password have been forgotten. While the nickname is used primarily for name recognition among participants in the marketplace, the e-mail address and the password are used for administrative purposes, as discussed further below.

In addition to just providing identifying information, a user can also enter contact information 148, which will be used by the facilitator to make payments to suppliers whose predictions are viewed by consumers. A user need only enter contact information, if the user wants to be compensated for providing predictions. For this, a first name field 150a, a last name field 150b, a street address field 152a, a city field 152b, a state/province field 152c, a postal/zip code field 152d and a country field 152e are provided to receive the name and address of a user. A telephone field 154 may also be provided for the user to enter his telephone number, in the event that the facilitator wishes to contact the user.

Once the requested information has been provided, a user may activate a register button 156 to submit the registration information. Upon registering, the user becomes a participant in the marketplace, and is authorized to supply predictions which consumers may view.

FIGS. 4a–c show the terms of registration page 160, presenting the terms and conditions of participation. Included in these are a brief summary of the rules concerning such things as the submission of predictions, charging a consumer for viewing predictions, compensating a supplier for viewed predictions, and other terms and conditions governing the participant as well as the facilitator.

FIGS. 5a & 5b show the information page 170 which provides directions on how to participate in the marketplace, tips on how to succeed in the marketplace, and also provides a number of links to other pages which a user may exercise.

The enter-your-picks link 172 sends a user to an enter-your-picks-category page 310 on which a supplier can view the various events for which predictions are being accepted, and then enter his predictions. There is no charge to enter predictions for events and so suppliers are not charged anything for their participation.

The line-policy link 174 sends a user to a line policy page 320 which explains how the facilitator sets the margin for an event in which the outcome is a numerical score—e.g., the point spread in a football game. Instead of, or in addition to, the margin, the line policy page may include information on odds, risk factors and other parameters which may be taken into account when making predictions of the offered events.

The view-your-performance link 176 sends a supplier to a performance page 200a which presents information on how well, i.e., how accurate, that supplier's predictions have been over a selected time period in a given event category. The performance page 200a also indicates the performance of the best predictors in the marketplace for comparable periods in the same event categories. This allows the participant/supplier to compare his own performance with those of the best prediction suppliers in the marketplace.

A supplier may only enter predictions for future events which have been selected by the facilitator. After a supplier has entered his predictions for an event, that supplier earns credits each time a consumer views his predictions. To maximize the number of consumer who will view his predictions for a given event, a supplier must try to do two things: enter his predictions as soon as the facilitator has identified the event(s) for which predictions will be accepted; and establish a good track record at accurately predicting the outcomes of events. The first of these is simply to make sure that his own predictions are posted for the longest time possible before the event occurs, thus providing maximum opportunity for consumers to select that supplier's predictions. The second is to establish that that supplier has been good at making predictions of past events, and so presumably will be good at predicting future events, thereby prompting consumers to elect to view that supplier's predictions.

To establish a track record, a supplier who has not entered any predictions before, must predict a number of events in a given event category over a period of time. By accurately predicting the outcome of several of these events, that supplier establishes a good track record which may merit being displayed on the list of best predictors over a preselected time period in a particular event category. Although some consumers are likely to be most interested in the predictions of a supplier who has established a good track record over an extensive period of time, say, 30 days, other consumers may only be interested in suppliers who have done very well over a much shorter period of time, and are on a 'hot streak'. Therefore, it is entirely possible that a supplier who has accurately predicted the outcomes of events for a very short time may find his predictions in demand.

The privacy-policy link 176 sends a user to a privacy policy page 300 explaining the facilitator's policy on revealing information about a member.

Figure 6:
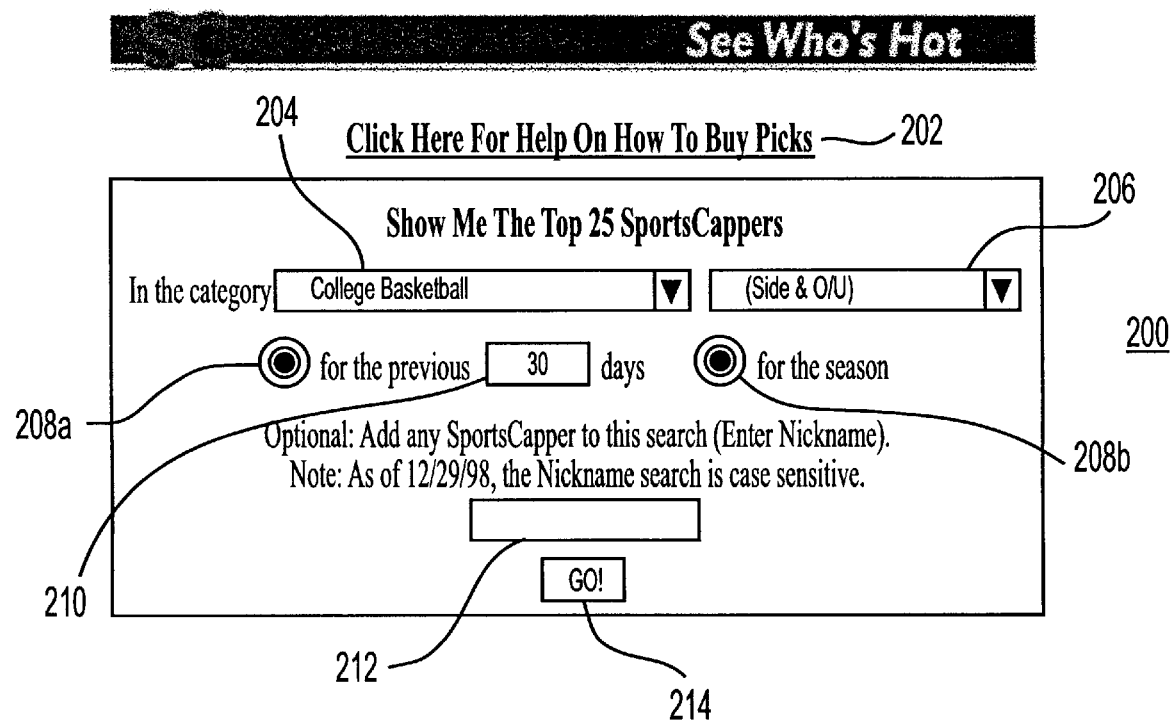

FIG. 6 shows the top-analysts-criteria page 200. This page 200 permits a user to enter a number of parameters to define the search for the best predictors to be displayed; the page also provides opportunities for a user to learn more about how the user can obtain additional information about obtaining predictions. Once the various search parameters have been set, a query engine searches through the database to extract information responsive to the set of parameters designated by the user (filtering) and then displays the responsive information in an order in accordance with some criterion (sorting). Thus, the information about the best predictors is found and formatted "on the fly" and is always up to date, rather than being a "canned" report which is periodically updated by the facilitator or other entity.

The how-to-buy-picks link 202 sends a user to a pick purchase instruction page 280.

The event-category window 204 provides a pull-down screen which allows a user to select the event category for which the best predictors will be displayed. In this embodiment, which is directed to the field of sports, a user can select the best predictors in one of several sports: college basketball, professional basketball, college football, professional football and professional hockey, college basketball being the default. It should be evident, however, that the selection of event categories in the field of sports may vary depending on the time of year. It should also be evident that non-team sports such as boxing, tennis, figure skating, golf, etc. may also serve as event categories in the field of sports.

The event-sub-category window 206 provides a pull-down screen which allows a user to select the kinds of sub-categories for each event which the search engine should take into account in identifying the best predictors. In the preferred embodiment, if a user were to pull down this window, the following choices would appear: "Side", "O/U" ('over/under') and "Side & O/U" (the default). "Side" refers to events in which a supplier picked which side would win, after the spread is taken into account. "O/U" refers to events in which the supplier picked whether the combined score of the teams was over, or under, a predetermined value selected by the facilitator; and "Side & O/U" refers to events in which the supplier made predictions on both of these event sub-categories. It should be evident that additional event sub-categories may be provided, and that different sports may have different subcategories. For instance, football games may include a "score by quarter O/U" sub-category, tennis matches may have a "games per match O/U" or "games per set O/U" sub-category; and hockey games may have a "shots on goal O/U" sub-category.

The number-of-days-criteria button 208*a*, the entire-season-criteria button 208*b* and number-of-days field 210 allow a user to define a relevant time period over which prediction performance for past events is taken into account in ranking the best predictors. If the user enables the number-of-days-criteria button 208*a*, and sets a value in the number-of-days field 210 to X, X being at least 1, the system will take into account the prediction performance over the most recent X days of all prediction suppliers in the selected event category, to determine the best predictors. If, on the other hand, a user enables the entire-season-criteria button 208*b*, the prediction performance for the entire season is taken into account. While the preferred embodiment allows one to define the relevant time period in either number of days, or the entire season, the important principle is that a user be able to define some predetermined criteria for selecting corresponding prediction performance data, from which the best predictors are determined. Thus, the facilitator may provide alternative options such as 'the last X predictions', or 'the best predictions in month X', and so forth.

The particular-supplier field allows a user to obtain the prediction performance record of one or more particular suppliers, over the defined period. This is done by entering the nicknames of the particular suppliers in field 212. If one or more particular suppliers' nicknames are entered in this field, their prediction performance results are displayed, in addition to those of the best predictors.

Once a user has completed selecting options on the top-analysts-criteria page 200, the user clicks on the 'Go' button 214 to obtain the best predictors, in accordance with the selected options. Clicking on this button causes the search engine to retrieve and display the best predictors on the top-analysts-display page 200*a*, which is displayed on the user's computer screen.

FIG. 7 shows the top-analysts-display page 200*a*, which displays the performance results of the 25 best prediction suppliers. This page also provides a link 216 for a member to log on so as to view his own prediction performance and compare it with the best.

The top 25 prediction suppliers, each listed by nickname 218, are ranked according to the number of rating points 220 ("units") each has earned, and also presents the number of correct and incorrect predictions each has made, along with additional statistics. If a supplier predicts an outcome correctly, he wins a first predetermined number of rating points and if the supplier guesses incorrectly, he loses a second predetermined number of rating points, preferably greater than the first predetermined number so as to provide a penalty for guessing. Because both correct and incorrect predictions are accounted for in the total rating points earned by a supplier, it may be possible for a supplier to have a net negative number of rating points over the course of a single day, or even a prolonged period. This allows new suppliers with relatively little experience to establish themselves as expert predictors by demonstrating that they have a positive number of rating points.

In the preferred embodiment, the best predictors are ranked in descending order, based on the total number of rating points each has earned, in accordance with the selection criteria specified on the top-analysts-criteria page 200. It should be evident, however, that other criteria, such as the ratio of rating-points-won to rating-points-lost, the ratio of correct to incorrect predictions, or daily average of the difference between rating points won and rating points lost, and a multitude of other metrics may used instead. What is important is that the system should calculate some metric which reflects the performance of the predictors in accordance with filtering criteria such as event categories, event determinations and relevant time periods.

The top-analysts-display page 200a also includes a supplier-research link 222 which allows a user to delve into the specific predictions made by a particular supplier, which led to that supplier being listed on the best predictors page display page. Clicking on the supplier-research link 222 sends the user to the supplier-daily-history page 230, which lists the day-by-day performance of the selected supplier.

The top-analysts-display page 200a also includes a future-games column 224 which indicates whether the corresponding supplier has made predictions for future events. If so, the corresponding column entry has a future-games link 226 which takes the user to a future-pick page 260. If a particular supplier has not made any predictions for future events, the corresponding entry in the future-games column 224 indicates that there are none 228.

FIG. 8 shows the supplier-daily-history page 230 for the supplier nicknamed 'slickrick' on the top-analysts-display page 200a. The supplier-daily-history page 230 displays slickrick's day-by-day prediction performance results for each day on which he predicted the outcome of one or more event. A user can delve into the particular events on any given day, by clicking the daily-research link 232. Clicking on the daily-research link 232 sends the user to a supplier-daily-event page 240 which details the predictions made by 'slickrick' for each event on the selected day, and the outcome of those events.

FIGS. 9a–9b show a supplier-daily-event page 240 for corresponding to a particular day on which 'slickrick' predicted the outcome of a number of college basketball games. As seen in these figures, 'slickrick' predicted the outcome of seven games taking place on Feb. 14, 1999. A daily-summary text box 242 repeats the summary information on the supplier-daily-history page 230 corresponding to the detailed information on the displayed supplier-daily-event page 240. Each of the games, game time and final score are identified in a past-game-information text box 244, along with information 246 about the outcome of that game. For each game, this information includes the point spread 248, the amount of rating points risked for incorrectly predicting the outcome of an event 250, the number of rating points gained for a correct prediction 252, the game score 254 and the outcome of 'slickrick's' prediction for that game 256, i.e., whether or not he was correct.

FIG. 10 shows a future-pick page 260 for 'slickrick'. The future-pick page 260 lists the various events 262 for which 'slickrick' has made predictions, including the start time of each event. An icon 264 next to each event 262 allows the user to add the corresponding prediction to the user's electronic shopping cart. If the user has not logged in, a text box 266 states this, and advises the user that one must either login or register to obtain predictions for the listed future events. A login link 268 and a register link 270 are provided to further assist the user. If the user were now to login (or register) as a member, and ultimately view 'slickrick's' predictions, 'slickrick' would earn money for each prediction that is viewed by that member.

FIG. 11 shows the how-to-buy-picks instruction page 280. This page has a first text box 282 advising that a user can get a list of the best predictors in an event category; a second text box 284 advising that a user can get research information about the underlying events predicted by each of the best predictors; a third text box 286 advising that a user can determine whether a particular supplier on the best predictors list has predictions for future events which may be viewed; a fourth text box 288 advising how a user can select one or more of those predictions for viewing and a fifth text box 290 advising how the user can pay for the predictions 290, either by having the cost debited to a credit card account, or debited to a prepaid account which has been arranged with the facilitator. Other forms of payment, such as debiting a bank account or electronic cash may also be provided for. Additional text boxes may be provided to provide further detail about any one or more of these directions.

FIG. 12 shows the privacy-policy page 300, which includes a text box 302 explaining the facilitator's policy regarding dissemination of information about members. The facilitator may set up certain guidelines to ensure the privacy of members in the marketplace, and agree only to display the members'own nicknames, such as when displaying the top-analysts-display page 200a.

FIG. 13 shows the enter-your-picks-category page 310. Information about how to make predictions, how the point spread works, and when one can make predictions can be obtained by clicking the line-policy link 312 and going to the line-policy page 320. This page also includes a pull-down menu 314, which allows a user to select from among a number of categories in which predictions for future events are being accepted by the facilitator. Once the user has selected the desired category in which the predictions are to be made, the user clicks on the "Go" button 316 to start entering his predictions. If the user is a member who is logged in as a supplier, clicking the "Go" button sends the supplier to the enter-your-picks-play page 370. If, on the other hand, the user is neither logged in nor recognized by the facilitator as a supplier, clicking the "Go" button 316, sends the user to an enter-your-picks-not-logged-in page 340.

FIG. 14 shows a sample line-policy page 320 for event categories in the field of sports. The line policy page includes a line-source text box 322 which explains the basis for the betting line used. A pick-entry-opening-times text box 324 explains when predictions may be entered each day for the various sports. A spreads-and-odds text box 326 explains how the spreads and risks work for each of the event categories—for each event, a user risks losing a first designated number of rating points to win a second designated number of rating points. Typically, the amount risked is greater than the amount that one can win to penalize random guessing, and the differential between the two varies from sport to sport, and sometimes even event to event. A presentation text box 328 explains the layout of the pick options, and a questions text box 330 provides a link for users to contact the facilitator.

FIG. 15 shows the enter-your-picks-not-logged-in page 340. This page includes a text box 342 advising the user that he is not logged in, and providing links to enable the user to either login or register. The page 330 nevertheless lists the events for which predictions are being accepted. Each event is provided with an upcoming event information text box 344 listing the teams, and the time that the event will start. In the preferred embodiment, one is not permitted to make predictions after an event starts. Event prediction information 346 is also provided for each of the events. The prediction information includes the point spread 348, the amount of rating points risked 350 if one were to incorrectly predict the outcome of the event, and the amount of rating points that can be earned 352 if one were to correctly predict the outcome of the event. A pick column 354 allows the user to enter his prediction for those events which are enabled, as indicated by the pick status column 356. In page 340, because the user is not logged in, all picks are disabled, as indicated by 'no pick' designations 358, 360.

FIG. 16 shows the enter-your-picks-play page 370, which is substantially similar to the enter-your-picks-not-logged-in page 350. A text box 372 on page 370 provides a link to the line policy page 320. A supplier may enter his prediction for each of the listed events by clicking on the icon 374 in the pick column 376 for those events which are not designated in the no-pick column 378 as being disabled 380. Once the supplier has selected and edited his picks, the supplier may then enter them by clicking on the submit-picks button 382. Clicking on the submit-picks button 382 causes a confirmation of picks screen 390 to be displayed.

FIGS. 17a–b shows the confirmation-of-picks page 390. This page 390 includes text box 392 instructing the supplier how to confirm his picks once he has reviewed his selections A first icon 394 allows a supplier to confirm picks, and a second icon 396 allows the supplier to make changes to the picks previously selected. For each event, the confirmation-of-picks page 390 includes, among other items, the amount of rating points risked, the amount of rating points that one can win by predicting the outcome, and the prediction itself 398. After a particular event is over, the outcome of the event, e.g., the score of that particular ball game is entered into the database. This information will then be used to score the corresponding picks made by a supplier, when that supplier's prediction performance is next accessed.

Figure 18:
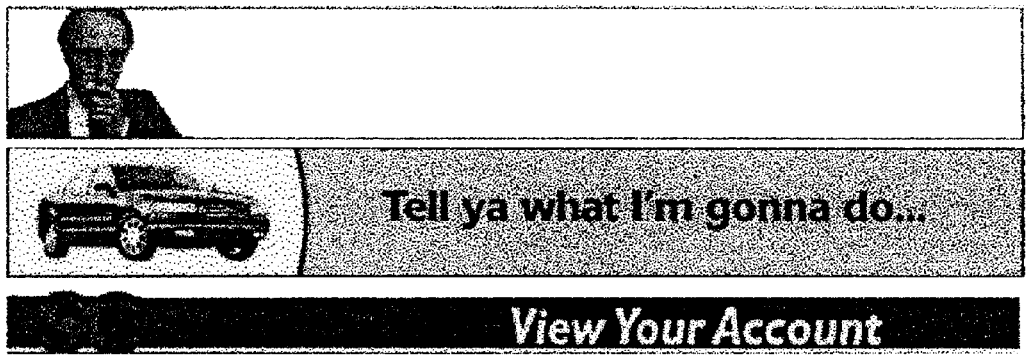

FIG. 18 shows a member-account page 400. The member-account page includes a field for displaying the pre-paid-credit balance 402 from funds that the member had previously deposited, the complimentary-credit balance 404 given from time to time by the facilitator, and the earnings 406 from consumers viewing that member's predictions. The pre-paid-credit balance may be from unused monies originally deposited by sending in a check or money order, authorizing charges to a credit card or a bank account, or receiving advance payment in some other manner. A registration update text box 408 on this page 400 provides the user with a link to change registration information.

FIG. 19 shows a shopping-cart-payment page 410. This page 410 includes a text box 412 providing members with the option to buy pre-purchased credit. An available-credit-information window 412 presents information on the credits or funds available for purchasing predictions. A present-sale window 414 presents information on the total amount of pending purchases of both predictions and additional pre-purchased credit, and provides the member with an icon 416 to remove items from the shopping cart which the member has previously selected for purchase. An applied-credit-information window 418 presents data on how the member has selected to pay for the current set of purchases, and a remaining credit after sale window 420 presents the remaining balance in various forms of credit after the purchase has been finalized and payment has been made. Finally, a use-credit icon 422 allows consumer to choose to pay for the purchases with a credit card, or other form of payment involving a financial institution.

In the SPORTSCAPPERS™ embodiment of FIGS. 2–19, a consumer of predictions must pay for the predictions of suppliers that that consumer wishes to view. Thus, the consumer is charged by the facilitator for viewing the predictions and the supplier whose predictions are viewed receives a portion of amount charged. One may instead establish a prediction marketplace in which a consumer may view the predictions for free, with most, if not all, revenue to compensate the suppliers being provided by advertisers. In such case, one does not need payment information from the consumers and no funds need be collected from them. The alternate embodiment in which consumers need not pay not only increases the number of consumers, who would then view the predictions for free, but also eliminates the administrative burdens and costs of collecting from the consumers.

FIGS. 20–23 illustrate a number of web pages from an alternate embodiment of a web-based prediction marketplace, called PREDICTIT!™, which has many functional features in common with the SPORTSCAPPERS™ embodiment. In contrast to the SPORTSCAPPERS™ embodiment, the PREDICTIT!™ embodiment does not charge consumers for viewing a supplier's predictions and so a supplier whose predictions are viewed is not paid a portion of any payment made by the consumer to the facilitator. Instead, a supplier earns a small amount of money, for example, $0.01, each time any of his prediction are viewed by a consumer, and these monies are provided indirectly by advertisers on the web-site.

FIG. 20 shows the home page 500 of the PREDICTIT!™ web-site. A login window 502 asks a user to log onto the web-site by entering an e-mail address and password. If the user has not previously registered, the user may do so by activating the register hot link 504 to be transferred to a registration page 510.

Figure 21A:
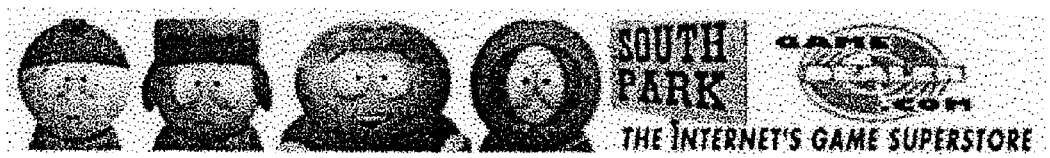
FIGS. 21A & 21B are the registration pages.
Figure 21B:

FIGS. 21A & 21B show the registration page 510. The registration page 510 displays a number of mandatory fields 512 for entering information which is required of all users, whether they wish only to view others'predictions, or provide predictions for others to view.

In addition to the required information, the registration page also includes a number of optional fields 514 which the user must fill out, if that user wishes to be compensated for having their predictions viewed. The optional fields 514 call for information which helps the facilitator contact a supplier who is to be paid for his predictions, and for other matters. After filling out the registration information, the user clicks on the register button 516 to submit the registration information.

FIG. 22 shows the welcome page 520 to which the member is transferred, after either registering on registration page 510, or having logged in on home page 500. The welcome page 520 provides the member with a number of interactive windows. Included among these are a logout window 522 which permits the member to log out of the web-site and return to the home page 500, an enter-picks window 524 which permits the member to select an event category 526 before proceeding to an enter-picks page, and a view-top-analysts window 528 which permits the member to specify a number of parameters before being transferred to a top-analysts-criteria page 550. In addition to the windows 522, 524 and 528, the welcome page also includes an enter-picks hot link 530 which transfers the member to the enter-picks page, a view-top-analysts hot link 532 which transfers the member to the top-analysts-criteria page 550, and a view-earnings hot link 534 which transfers the user to a view-earnings page.

FIG. 23 shows the top-analysts-criteria page 550. This page allows a member to specify a number of criteria to determine which predictors'performance results are displayed. Included among these criteria are an event-category pull-down window 552, an event-sub-category pull-down window 554, a time-period-criteria option set 556 which allows one to specify the X most recent days, the entire season, or a range of dates, a minimum-number-of-picks option 558 which will only present results for suppliers who have made no less than the specified number of relevant events, and a particular-supplier field 560 which allows the user to enter the nickname of a particular supplier, and have that particular supplier's results displayed along with those of the top analysts.

In addition to the above criteria, the top-analysts-criteria page also includes a group option 562. In this context, a 'group' means a list of member nicknames, the group itself having name specified by the user. The purpose of a group is to act as a filter in selecting which suppliers'prediction performance should be displayed. When the group option 562 is selected, the user is transferred to a group-management page 570.

FIG. 24 shows the group-management page 570. In the preferred embodiment, the group-management page includes a particular-supplier window 572 in which a user can enter the nickname a particular supplier whose prediction performance results are to be viewed. The group management page also includes a number of windows and links which allow to manipulate the groups. Included among these are an add-group link 574 which allows the user to create an entirely new group, a select-group pull-down window 576 to permit the user to either delete an existing group or select which of a number of existing groups should have their members'prediction performance displayed (the default being the top 25 prediction suppliers), an add-group window 578 which allows the user to create a new group and an edit-group pull-down window 580, which allows a user to edit the membership list of an existing group.

The use of the various group functions should now be evident. By activating the add-group link 574, a member may create a group named "favorites" which comprises his favorite prediction suppliers. Once the "favorites" group has been created, that member may easily obtain the performance results for all members of that group by simply selecting the 'favorites' group from among those in the select-group window 576. This avoids the necessity of manually entering the nickname of each member in the particular-supplier field 560. Similarly, each of a handful of members may decide to create a group named "buddies" which comprises their own nicknames. This allows the members of the "buddies" group to compare prediction performance amongst themselves. Thus, using groups provides an alternative to only displaying the prediction performance of the best predictors, and this feature can be used in either the paying, or the non-paying, embodiment.

Since the prediction marketplace of the PREDICTIT!™ embodiment is free to consumers, one may wish to ensure that a supplier does not benefit from having his friends repeatedly view that supplier's same information, either manually or by means of an automated routine such as computer program. This is because suppliers are compensated based on the number of times consumers access their predictions, and so it would be prudent to protect against repeated viewings of a supplier's predictions by the same consumer(s) solely to increase a particular supplier's earnings. One can prevent a supplier from benefitting from such collusive activity by keeping track of which consumers have viewed which of that supplier's predictions, resulting in that supplier having been credited for such viewing, i.e., a "credited prediction". Tracking this information may be done in any number of ways, including planting cookies on a consumer's computer, keeping and updating entries in a file created for each prediction, each supplier or each consumer, or any of a number of other techniques. By keeping track of a supplier's credited predictions, one may then ensure that a supplier is not multiply credited due to the actions of the same consumer repeatedly viewing the predictions of the same supplier. For instance, a particular supplier may not be credited a second time when the same consumer views any one or more of the following: a) the same exact prediction, b) a different prediction either on the same day and/or in the same event category, or c) a different prediction in a different field. It is understood, however, that other such heuristics may be used to prevent a supplier from being credited for having his predictions viewed by the same consumer. In addition, it should also be understood that different event categories, and even different events, may employ dissimilar criteria for preventing a supplier from benefitting from the same consumer's actions, if that supplier has a credited prediction due to that consumer.

In either embodiment, payment is made to suppliers from time to time by the facilitator. Payment to a particular supplier may be made either periodically regardless of the amount due to that supplier, or may be made whenever that supplier earns a predetermined amount of money, say, $20.00. The form of cash payment may take one of several forms. It can be a check sent to the address supplied by the supplier, a monetary credit made to a supplier's credit card, or even a direct deposit made to a bank account of the supplier, among others. One skilled in the art will readily recognize that non-cash payments, such as merchandise credits, frequent flier miles, and other such non-monetary type of compensation can be arranged for, if the facilitator and a third party such as a corresponding store or airline so arrange.

It should be noted that while the above embodiments are directed to predicting events in the general field of sports, the present invention could just as easily be applied to predictions in fields other than sports. For instance, there can be a prediction marketplace for the financial field in which event categories such as stocks, bonds, commodities, currency and other securities may be provided and in which suppliers may predict the levels of such things as individual stocks, mutual funds, treasury yields, oil futures, and currency exchange rates over various time periods. Similarly, fields as diverse as weather (e.g., predicting temperature, snow fall, rain, etc. at various locations over different time periods), entertainment (e.g, predicting winners of Oscar, Grammy, Emmy & Tony awards, etc.) and even politics (e.g., predicting election results, outcomes of legislation, etc.) may all be suitable for a web-based prediction marketplace.

Similarly, while in the described embodiments, it is the facilitator who determines the events for which predictions are accepted, the present invention is not limited to this. One or more options, links and windows may be made available to enable a user to enter information about one or more upcoming events. That user, and others, may then enter predictions about the outcome of that event. Such a provision would allow one or more members to make predictions about events which they have specified and which presumably are of significance to themselves. For instance, the members of the aforementioned "college buddies" group might create events for their alma mater's games, not otherwise provided for by the facilitator. Similarly, participants in community sports events, such as softball leagues, little leagues, high school sports, and the like, may thus find a forum in which to supply and consume each others' predictions.

What is claimed is:

1. A method of providing an electronic marketplace of predictions over a communications network, the method comprising:

electronically receiving and storing at least one prediction of at least one supplier for at least one event whose outcome has not yet been determined;

displaying a first screen requesting identifying information from a first consumer, determining at least one performance metric reflective of the accuracy of said at least one prediction, after the outcome of the event has been determined;

displaying a second screen showing said performance metric, upon request by said first consumer;

displaying a first supplier's prediction for a first upcoming event to said first consumer, upon request by that consumer to view said first supplier's prediction;

debiting an account of said first consumer for requesting said first supplier's prediction; and crediting an account of said first supplier, whose prediction for the first upcoming event has been displayed upon the request of said first consumer.

2. The method of claim 1, wherein one of a prepaid account of the first consumer, a bank account of the first consumer, and a credit card account of the first consumer is debited for requesting said first supplier's prediction.

3. The method of claim 1, wherein the step of displaying said second screen comprises displaying performance metrics for each member of a group comprising a plurality of suppliers, membership in said group having been previously selected by said consumer.

4. A method of providing an electronic marketplace of predictions over a communications network, the method comprising:

electronically receiving and storing at least one prediction of at least one supplier for at least one event whose outcome has not yet been determined;

displaying a first screen requesting identifying information from a first consumer;

determining at least one performance metric reflective of the accuracy of said at least one prediction, after the outcome of the event has been determined;

displaying a second screen showing said performance metric, upon request by said first consumer;

displaying a first supplier's prediction for a first upcoming event to said first consumer, upon a current request by that consumer to view said first supplier's prediction;

determining whether said first consumer has previously viewed a credited prediction of said first supplier; and crediting an account of said first supplier, whose prediction for the first upcoming event has been displayed in response to the current request of said first consumer.

5. The method of claim 4, wherein the account of the first supplier is credited only if the first consumer has not previously viewed a credited prediction of said first supplier.

6. The method of claim 5, wherein the credited prediction of said first supplier is the same as the prediction for the first upcoming event.

7. The method of claim 5, wherein the credited prediction of said first supplier was previously viewed on the same day that the current request is being made.

8. The method of claim 5, wherein the credited prediction of said first supplier is in a same category as said first upcoming event.

9. The method of claim 4, further comprising the step of displaying at least one advertisement to said first consumer, and wherein said first consumer is not charged for requesting said first supplier's prediction.

10. The method of claim 4, wherein the step of displaying said second screen entails displaying performance metrics for each member of a group comprising a plurality of suppliers, membership in said group having been previously selected by said consumer.

11. A computer storage medium comprising:

code for electronically receiving and storing at least one prediction of at least one supplier for at least one event whose outcome has not yet been determined;

code for displaying a first screen requesting identifying information from a first consumer;

code for determining at least one performance metric reflective of the accuracy of said at least one prediction, after the outcome of the event has been determined;

code for displaying a second screen showing said performance metric, upon request by said first consumer, code for displaying a first supplier's prediction for a first upcoming event to said first consumer, upon a current request by that consumer to view said first supplier's prediction;

code for determining whether said first consumer has previously viewed a credited prediction of said first supplier; and code for crediting an account of said first supplier, whose prediction for the first upcoming event has been displayed in response to the current request of said first consumer.

12. The computer storage medium of claim 11, wherein the code for crediting an account of said first supplier includes code to credit that account only if the first consumer has not previously viewed a credited prediction of said first supplier.

13. The computer storage medium of claim 11, wherein the code for displaying said second screen includes code for displaying performance metrics for each member of a group comprising a plurality of suppliers, membership in said group having been previously selected by said consumer.

14. A computer programmed to:

electronically receive and store at least one prediction of at least one supplier for at least one event whose outcome has not yet been determined;

display a first screen requesting identifying information from a first consumer;

determine at least one performance metric reflective of the accuracy of said at least one prediction, after the outcome of the event has been determined;

display a second screen showing said performance metric, upon request by said first consumer; display a first supplier's prediction for a first upcoming event to said first consumer, upon a current request by that consumer to view said first supplier's prediction;

determine whether said first consumer has previously viewed a credited prediction of said first supplier; and credit an account of said first supplier, whose prediction for the first upcoming event has been displayed in response to the current request of said first consumer.

15. The computer of claim 14, wherein the computer is further programmed to credit said account of said first supplier, only if the first consumer has not previously viewed a credited prediction of said first supplier.

16. The computer of claim 14, wherein the computer is further programmed to display performance metrics for each member of a group comprising a plurality of suppliers, membership in said group having been previously selected by said consumer.

17. A method of providing an electronic marketplace for predictions, the method comprising:

receiving at least one prediction from each of a plurality of prediction suppliers;

calculating performance information reflective of the accuracy of said predictions made by each of said plurality of prediction suppliers;

transmitting said performance information to a prediction consumer;

receiving a request from said prediction consumer to purchase a new prediction from a prediction supplier selected by said prediction consumer;

transmitting said new prediction to said prediction consumer; and crediting an account of the prediction supplier selected by the prediction consumer.

18. The method of claim 17, wherein said new prediction pertains to at least one of the group consisting of stocks, mutual funds, treasury yields, oil futures and currency exchange rates.

19. The method of claim 18, wherein said new prediction pertains to an individual stock.

20. The method of claim 17, comprising transmitting performance information for prediction suppliers having the best performance records.

21. The method of claim 17, further comprising transmitting instructions on how to submit predictions; and transmitting instructions on how to purchase predictions.

22. The method of claim 17, wherein said new prediction pertains to sporting events.

23. A computer storage medium comprising:

code for receiving at least one prediction from each of a plurality of prediction suppliers;

code for calculating performance information reflective of the accuracy of predictions made by each of said plurality of prediction suppliers;

code for transmitting said performance information to a prediction consumer;

code for receiving a request from said prediction consumer to purchase a new prediction from a prediction supplier selected by said prediction consumer;

code for transmitting said new prediction to said prediction consumer; and code for crediting an account of the prediction supplier selected by the prediction consumer.

24. A computer programmed to:

receive at least one prediction from each of a plurality of prediction suppliers;

calculate performance information reflective of the accuracy of predictions made by each of said plurality of prediction suppliers;

transmit said performance information to a prediction consumer;

receive a request from said prediction consumer to purchase a new prediction from a selected prediction supplier;

transmit said new prediction to said prediction consumer; and credit an account of the selected prediction supplier.

25. A method of obtaining prediction information, the method comprising:

viewing performance information reflective of the outcome of at least one past prediction made by at least one prediction supplier;

viewing which prediction information is available from at least one prediction supplier, electing to purchase prediction information from a selected prediction supplier;

viewing said purchased prediction information; and crediting an account of the selected prediction supplier.

* * * * *